United States Patent [19]
Schultz et al.

[11] Patent Number: 5,946,620
[45] Date of Patent: Aug. 31, 1999

[54] METHOD FOR SUBSCRIBER REGISTRATION IN A RADIO COMMUNICATION SYSTEM

[75] Inventors: Charles P. Schultz, Hialeah; Mitchell E. Renko, Davie; Audrey Longhurst, Weston, all of Fla.

[73] Assignee: Motorola, Inc., Schaumburg, Ill.

[21] Appl. No.: 08/900,583

[22] Filed: Jul. 25, 1997

[51] Int. Cl.$^6$ .................................................. H04Q 7/22
[52] U.S. Cl. .......................... 455/435; 455/432; 455/433
[58] Field of Search .................................. 455/412, 432, 455/435, 524, 433, 518

[56] References Cited

U.S. PATENT DOCUMENTS

| | | | |
|---|---|---|---|
| 4,852,148 | 7/1989 | Shibata et al. | 379/59 |
| 5,289,527 | 2/1994 | Tiedemann, Jr. | 455/432 |
| 5,475,735 | 12/1995 | Williams et al. | 455/435 |
| 5,479,481 | 12/1995 | Koivunen | 379/59 |
| 5,574,973 | 11/1996 | Borth et al. | 455/33.1 |
| 5,588,043 | 12/1996 | Tiedemann, Jr. et al. | 455/435 |
| 5,627,877 | 5/1997 | Penttonen | 379/58 |
| 5,629,975 | 5/1997 | Tiedemann, Jr. et al. | 379/60 |
| 5,675,629 | 10/1997 | Raffel et al. | 455/435 |
| 5,694,393 | 12/1997 | Kaye | 455/518 |
| 5,905,950 | 5/1999 | Anell | 455/421 |

*Primary Examiner*—Reinhard J. Eisenzopf
*Assistant Examiner*—Duc Nguyen
*Attorney, Agent, or Firm*—Andrew S. Fuller

[57] ABSTRACT

A radio communication system (100) has a subscriber unit (150) that operates to reduce registration requirements, particularly for power up operations. The subscriber unit (150) saves communication environment information before powering down, and restores the stored communication environment upon a subsequent power up, if the stored environment is deemed current (200, 300). Preferably, the subscriber unit (150) provides notification to the system of its powered up / down status (230, 335). The subscriber unit may complete a full power up registration process if the stored communication environment is determined to be outdated (360).

18 Claims, 3 Drawing Sheets

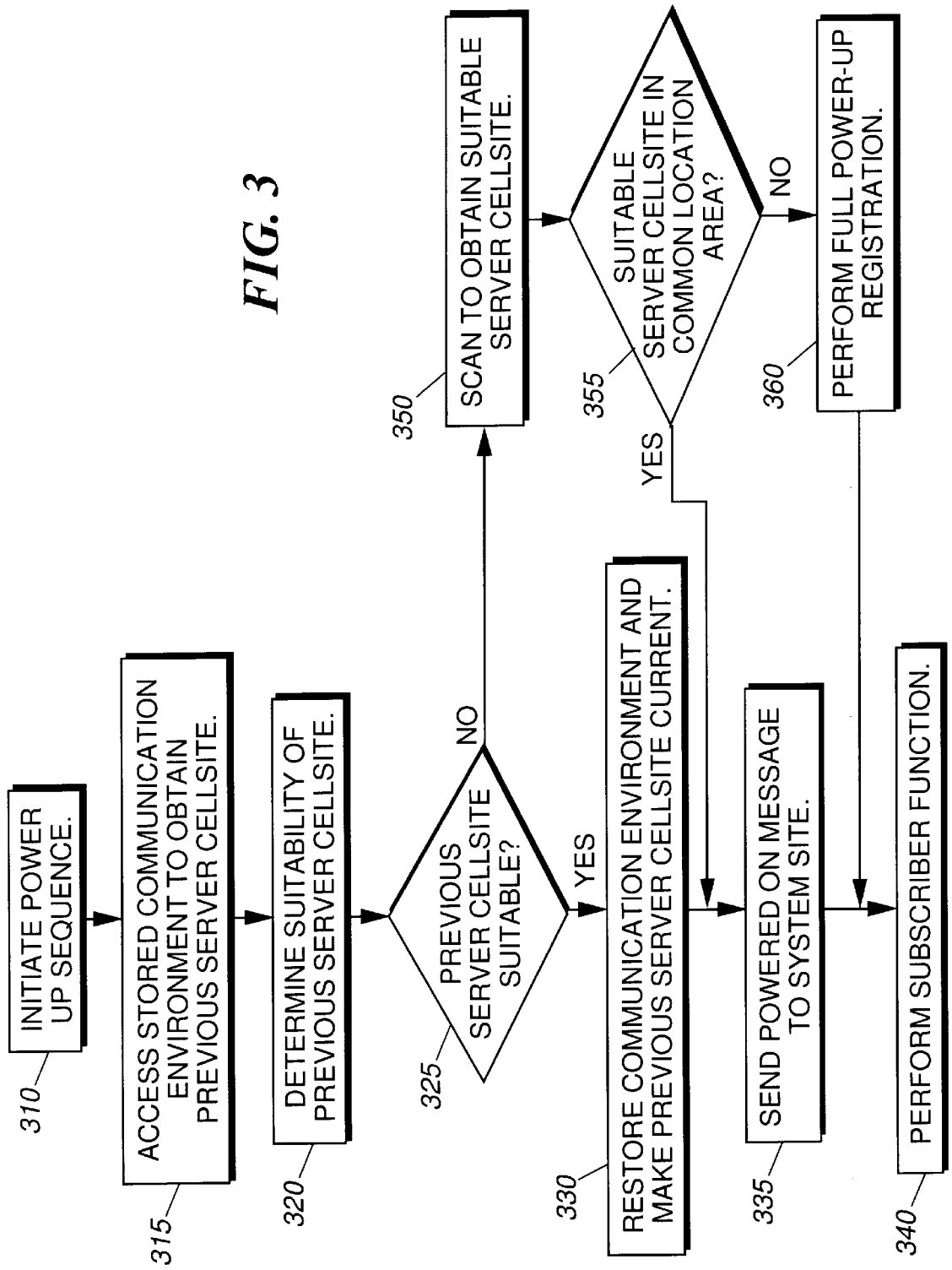

METHOD FOR SUBSCRIBER REGISTRATION IN A RADIO COMMUNICATION SYSTEM

TECHNICAL FIELD

This invention relates in general to radio communication systems, and more particularly, to subscriber registration in a multisite radio communication system.

BACKGROUND

Many radio communication systems operate using multiple communication sites that serve specific geographical regions. A subscriber unit operating within such a system typically undergo a registration process in order to facilitate communication within the system. For the system, the registration process provides such information as the identity, configuration, location, and server site for the subscriber unit. Similarly, for the subscriber unit, the registration process provides information about the communication environment and associated parameters.

The communication parameters established during the registration process are subject to change over time. For example, after registration, a mobile subscriber unit may change location and require a new server site. Additionally, the subscriber unit may power down or may otherwise be unavailable to participate in communications. Thus, the information gathered during registration may need to be updated based upon certain circumstances. Many prior art systems perform registration as part of a power up sequence, although registration may be performed under a variety of other conditions. U.S. Pat. No. 5,629,975 issued to Tiedemann, Jr. et al. on May 13, 1997 describes power up, zone based, distance based, timer based, ordered, parameter change, and power down registration.

Depending on system design, registration can be a time consuming process. A subscriber unit may be required to determine available communication sites, to select a server site, to transmit vital communication parameters, and to receive information concerning its environment. While performing these functions, the subscriber unit is usually unavailable for use by a user. It is desirable to minimize the time needed for power up in order to facilitate rapid availability of the subscriber unit. Therefore, a new approach to subscriber registration is needed.

BRIEF DESCRIPTION OF THE DRAWINGS

FIG. 3 is a flowchart of procedures used by the subscriber unit upon subsequent a power up, in accordance with the present invention.

DETAILED DESCRIPTION OF THE PREFERRED EMBODIMENT

The present invention provides for subscriber registration efficiency in radio communication systems, and particularly, efficiency in power up registrations. A subscriber unit that communicates with a system site, according to the present invention, saves communication environment information before powering down, and restores the stored communication environment, if deemed current, upon a subsequent power up. Preferably, the subscriber unit stores the particulars of its last server site locally as part of the communication environment information, and notifies the system site of the impending power down. Upon a subsequent power up, the subscriber unit monitors to detect transmissions of system information on a channel serviced by the last server site. If system information is detected that corresponds to the stored environment information, the system site is notified of the subscriber units power on state. Otherwise, a more complete power up registration is performed.

Figure 1:
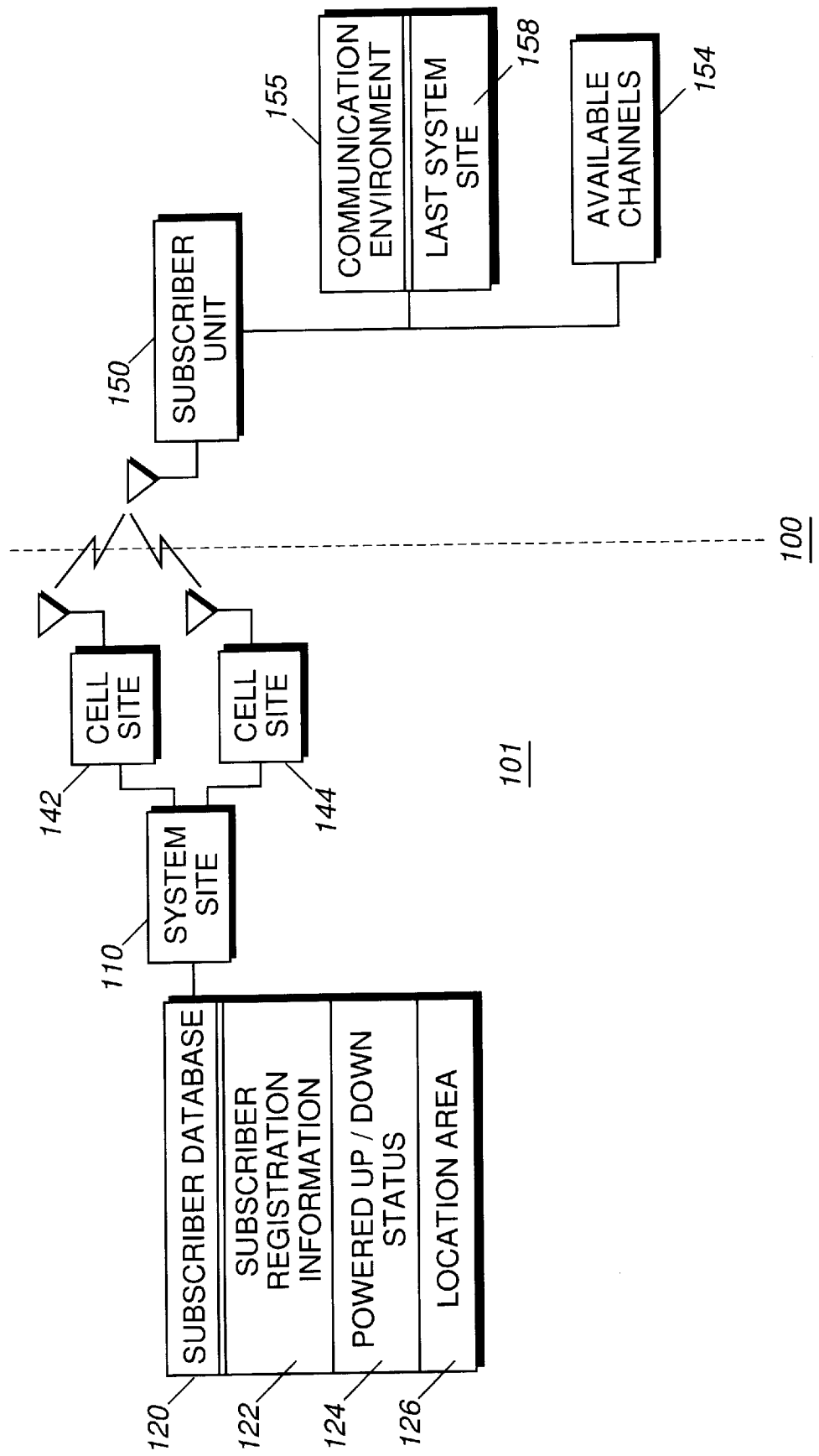
FIG. 1 is a block diagram representing a radio communication system, in accordance with the present invention.

Referring to FIG. 1, a radio communication system 100 is shown, in accordance with the present invention. The radio communication system 100 includes an infrastructure network 101 that supports operational control of the radio communication system 100. The infrastructure network includes fixed network equipment at a system site 110, and fixed equipment at cell sites 142, 144. In the preferred embodiment, the cell sites 142, 144 are situated to serve different geographical regions and are networked with the system site in a manner commonly found in the art. The infrastructure network 101 also includes subscriber units 150 (only one shown), which are preferably mobile radio communication devices, which include portable radio devices. The mobile radios 150 communicate with the system site 110 via a server cell site selected from among the available cell sites 142, 144.

The system site 110 is coupled to a subscriber database 120 that contains information needed to manage communications between the infrastructure network 101 and subscriber units 150. The subscriber database 120 includes subscriber registration information 122 needed to track and manage communication between the infrastructure network 101 and the subscriber units 150. Thus, for example, information on subscriber identification, location, serving cell site, and other communication parameters, and the like, may be included with the registration data. According to the present invention, the subscriber database 120 includes fields for storing information on the powered up/down status 124 of a subscriber unit, and its location area 126. A powered up status indicates that a subscriber unit is available for communication, while a powered down status indicates otherwise. The location area 126 provides for grouping of cell sites to facilitate paging of a subscriber unit, which reduces the overhead that would otherwise be required to track a subscriber unit to a specific cell site.

Each subscriber unit 150 has a local non-volatile memory area 155 that stores communication environment information, including communication parameters for the last server cell site 158 used for communicating with the infrastructure network 101. In the preferred embodiment, the communication parameters for the last server cell site include control channel frequency, cell site identification, cell version, and location area information. The subscriber unit 150 updates the communication environment information before powering down and accesses this information after powering up, according to the present invention. The subscriber unit also has access to a set of frequency channels 154 representing a set of potentially available server cell sites. The frequency channels are ordinarily control channels over which radio system control information is communicated.

In the preferred embodiment, a complete or full power up registration process involves the acquisition and storage of information needed to facilitate communication between the subscriber unit and the system site. The subscriber unit operates to monitor signals on frequencies potentially used by cell sites operable within the radio communication system. A potential server cell site is identified when the monitored signals on a particular frequency yield system information that is consistent with that expected by the subscriber unit. An exchange of information between the subscriber unit and the system site then follows. Information about the subscriber unit, such as subscriber identification, configuration, location area, and the like, is then entered in the subscriber database 120 at the system site. Similarly, communication environment information, such as location area, server cell site, neighbor cell sites, and the like, is stored at the subscriber unit 150.

Figure 2:
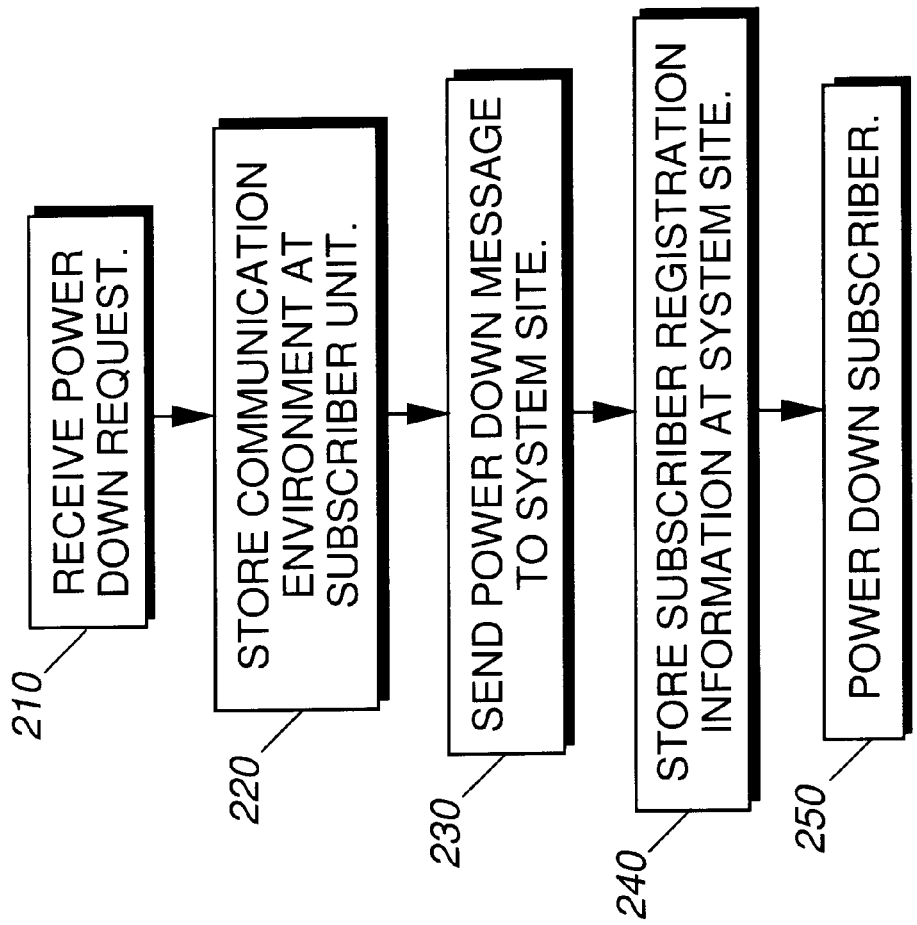
FIG. 2 is a flowchart of procedures that govern operation of a subscriber unit and system site prior to powering down, in accordance with the present invention.

FIG. 2 is a flowchart of procedures 200 used by the subscriber unit and system site prior to powering down, in accordance with the present invention. A power down routine is executed upon the receipt of a power down request or the detection of a power down requirement at the subscriber unit, step 210. Communication environment information is stored in nonvolatile memory at the subscriber unit, step 220. Preferably, the communication environment stored includes information on the last server cell site used to communicate with the system site, location area information, along with any information ordinarily derived from the power up registration process. After storing the communication environment used by the subscriber unit before execution of the power down routine, the storing of registration information pertaining to the subscriber unit at the system site is initiated. The subscriber unit notifies the system site of its impending powered down state by sending a powered down message to the system site, step 230. In the preferred embodiment, the system site stores the registration information pertaining to the subscriber unit, and associates a powered down/off status with the registration information upon receipt of the powered down message, step 240. This prevents unnecessary paging of the subscriber unit by the system. Storing of the registration information at the system site also allows the subscriber unit to avoid a full registration upon a subsequent power up under certain circumstances. The subscriber unit then proceeds to power down, having saved its communication environment, step 250.

FIG. 3 is a flowchart of procedures 300 used by the subscriber unit upon subsequent a power up, in accordance with the present invention. The subscriber unit executes a power up routine, by initiating a power up sequence that may include hardware and software initialization, step 310. The subscriber unit then determines whether the communication environment present before the last power down can be restored, or whether a more complete power up registration process is needed. The stored communication environment information is accessed to obtain communication parameters pertaining to the previous server cell site by the subscriber unit, step 315. The subscriber unit then retrieves the stored communication parameter information to determine suitability of the previous server cell site as a current server cell site, step 320. To determine suitability of the server cell site, the subscriber unit monitors to detect communication signals or transmissions on a control channel, and compares the signal strength of detected transmissions to predetermined threshold values. If the transmissions have sufficient signal strength, and other communication parameters are satisfactory, the subscriber unit compares the content of the transmissions, such as detected system information, to stored information previously obtained from the server cell site to determine overall suitability. In the preferred embodiment, the environment information is deemed current when identification information obtained from the server cell site accessed corresponds to the information stored for the previously used server cell site. Accordingly, the complete power up registration process is bypassed yielding significant time savings and enhanced availability of the subscriber unit for communication operations.

If the previous cell site is determined be suitable for server operations, and the communication environment deemed current, the stored communication environment is restored, and the previous server cell site made current, steps 325, 330. Thus, the subscriber unit is configured to use the previously stored server cell site as a server cell site for communications with the system site. The subscriber unit then sends a powered on message to the system site to notify the system site of its powered on status, step 335. Additional subscriber functions are then performed, step 340. Upon receipt of the powered on message, the system site activates the registration information associated with the subscriber unit stored in the subscriber database and updates the corresponding status indicator to reflect a powered on status.

When it is determined that the previous server cell site is not suitable, the subscriber unit proceeds to select a suitable server cell site from a stored list of channels representing potentially available cell sites. The subscriber unit scans a set of channels to obtain a suitable server cell site, step 350. Preferably, the subscriber unit monitors transmissions from the available cell sites, and measures communication parameters such as signal strength, loading, and the like, in order to select an appropriate server cell site. When a suitable cell site is selected, the subscriber unit determines whether its location area matches that of the stored server cell site, thereby indicating membership in a particular grouping of cell sites. If the selected server cell site has a common location area with the stored server cell site, step 355, at least a subset of the stored communication environment is deemed current. If necessary, additional information is retrieved or exchanged, via the selected server cell site, that is combined with the subset of the communication environment information to form a complete set of registration information. A powered on message is the sent to the system site, step 335. Otherwise, the full power up registration process is completed, step 360. Thus, a registration procedure executed with the system site, and the subscriber unit configured with updated environment information obtained during the registration procedure. Preferably, the system site disassociates the powered down status for the subscriber unit when the subscriber unit registers through a cell site inconsistent with the registration information stored.

The present invention provides for significant advantages over the prior art. Substantial time savings may be achieved by avoiding a full power up registration when a subscriber unit powers on in a communication environment that is identical or similar to the environment that existed prior to powering down.

What is claimed is:

1. In a radio communication system having a subscriber unit and a system site, a method for registration, comprising the steps of, at the subscriber unit:
  executing a power down routine, including the steps of:
    storing, at the subscriber unit, environment information required for communication with the system site;
    initiating storing of registration information pertaining to the subscriber unit at the system site;
  executing a subsequent power up routine, including the steps of:
    determining whether the environment information is current;
    when the environment information is current:
      configuring the subscriber unit with the environment information; and notifying the system site to use the stored registration information for the subscriber unit.

2. The method of claim 1, wherein:

the step of initiating storing of registration information comprises the step of sending a powered down message to the system site; and the step of notifying the system site comprises the step of sending a powered on message to the system site.

3. The method of claim 2, further comprising, at the system site, associating a powered down status with registration information pertaining to the subscriber unit upon receipt of the powered down message.

4. The method of claim 3, further comprising, at the system site, disassociating the powered down status when the subscriber unit registers through a cell site inconsistent with the registration information stored.

5. The method of claim 1, wherein:

the environment information comprises communication information for a particular server cell site used by the subscriber unit before execution of the power down routine;

the step of determining whether the environment information is current comprises the steps of:

retrieving the communication information stored for the particular server cell site;

monitoring to detect communication signals from the particular server cell site; and determining that the environment information is current when the communication signals detected indicate suitability of the particular server cell site for server operations.

6. The method of claim 1, wherein the environment information comprises particular server cell site information, and further comprising the steps of:

selecting a server cell site from among a plurality of available cell sites;

obtaining a subset of the particular server cell site information that is shared among members of a particular grouping of cell sites, when the selected server cell site is a member of the particular grouping of cell sites; and retrieving additional information, via the server cell site, that is combined with the subset of the particular server cell site information to form a complete set of registration information.

7. The method of claim 1, wherein the step of executing a subsequent power up routine, further comprises the steps of, when the environment information is not current:

executing a full power up registration procedure with the system site; and configuring the subscriber unit with updated environment information obtained during the registration procedure.

8. In a radio communication system having a subscriber unit and a system site, a method for subscriber registration, comprising the steps of:

at the subscriber unit:

detecting a power down request at the subscriber unit;

storing environment information required for communication with the system site;

notifying the system site of a powered down state;

powering down the subscriber unit;

at the system site, storing status information for the subscriber unit indicating a powered down state;

at the subscriber unit upon powering up subsequent to the step of powering down:

determining whether the environment information is current;

configuring the subscriber unit with the environment information when the environment information is current; and notifying the system site of a powered up state for the subscriber unit.

9. The method of claim 8, further comprising the step of, at the system site, storing registration information pertaining to the subscriber unit upon being notified of the powered down state.

10. The method of claim 9, further comprising, at the system site, updating the status information indicating a powered up state when the subscriber unit registers with a cell site.

11. The method of claim 8, wherein the environment information comprises particular server cell site information, and the step of configuring the subscriber unit comprises the step of selecting a server cell site for initial communications based on the particular server cell site information stored.

12. The method of claim 11, wherein the step of determining whether the environment information is current comprises the steps of:

obtaining identification information from the selected server cell site; and determining that the environment information is current when identification information obtained corresponds to the particular server cell site information stored.

13. The method of claim 8, further comprising, when the environment information is not current, the steps of:

executing a registration procedure with the system site; and configuring the subscriber unit with updated environment information obtained during the registration procedure.

14. In a radio communication system having a mobile radio, fixed system equipment, and a full power up registration process for the mobile radio, a method comprising the steps of:

storing communication environment information upon receipt of a power down request;

notifying the fixed system equipment of powered down status;

powering down the mobile radio;

upon powering up subsequent to the step of powering down:

determining whether the communication environment information stored is current;

notifying the fixed system equipment of powered up status, when the communication environment information stored is current; and completing the full power up registration process with the fixed system equipment, when the communication environment information stored is not current.

15. The method of claim 14, wherein the step of storing communication environment information comprises the step of storing communication parameter information for a particular cell site used as a server cell site when communicating with the fixed system equipment.

16. The method of claim 15, wherein the step of determining whether the communication environment information stored is current comprises the steps of:

monitoring to detect system information transmitted on a control channel used by the particular cell site; and comparing detected system information with corresponding information from the communication environment information stored.

17. The method of claim 16, wherein the step completing the full power up registration process comprises the step of monitoring transmissions from a list of available cell sites to select a server cell site for communication with the fixed system equipment.

18. In a radio communication system having a mobile radio, fixed system equipment, and a full power up registration process for the mobile radio, a method comprising the steps of:

at the mobile radio:
    detecting a power down request at the mobile radio;
    storing communication parameter information for a particular cell site used as a server cell site when communicating with the fixed system equipment;
    initiating storing of registration information pertaining to the mobile radio at the fixed system equipment;
    powering down the mobile radio;

at the mobile radio upon powering up subsequent to the step of powering down:
    using the stored communication parameter information to determine suitability of the particular cell site as a server cell site;

when the particular cell site is suitable:
    configuring the mobile radio to use the particular cell site as a server cell site for communications with the fixed system equipment;
    notifying the fixed system equipment of a powered up state for the mobile radio;

when the particular cell site is not suitable:
    monitoring transmissions from a list of available cell sites to select a server cell site for communication with the fixed system equipment; and
    completing the full power up registration process with the fixed system equipment via the server cell site.

\* \* \* \* \*